(12) United States Patent
Savary et al.

(10) Patent No.: US 9,933,164 B2
(45) Date of Patent: Apr. 3, 2018

(54) ANNULAR TURBOMACHINE COMBUSTION CHAMBER

(71) Applicant: SAFRAN HELICOPTER ENGINES, Bordes (FR)

(72) Inventors: Nicolas Savary, Jurancon (FR); Patrick Berteau, Arbus (FR); Bernard Carrere, Pau (FR); Jean-Marc Dubourdieu, Mazerolles (FR); Ludovic Naudot, Angais (FR)

(73) Assignee: Safran Helicopter Engines, Bordes (FR)

( * ) Notice: Subject to any disclaimer, the term of this patent is extended or adjusted under 35 U.S.C. 154(b) by 0 days.

(21) Appl. No.: 15/120,015

(22) PCT Filed: Jan. 27, 2015

(86) PCT No.: PCT/FR2015/050179
§ 371 (c)(1),
(2) Date: Aug. 18, 2016

(87) PCT Pub. No.: WO2015/124840
PCT Pub. Date: Aug. 27, 2015

(65) Prior Publication Data
US 2017/0067640 A1    Mar. 9, 2017

(30) Foreign Application Priority Data
Feb. 19, 2014   (FR) ...................................... 14 51321

(51) Int. Cl.
*F23R 3/52*      (2006.01)
*F23R 3/58*      (2006.01)
(Continued)

(52) U.S. Cl.
CPC .................. *F23R 3/52* (2013.01); *F02C 7/20* (2013.01); *F23C 5/02* (2013.01); *F23R 3/002* (2013.01);
(Continued)

(58) Field of Classification Search
CPC .. F23R 3/002; F23R 3/007; F23R 3/60; F23R 3/50; F23R 2900/00017; F23R 3/52;
(Continued)

(56) References Cited

U.S. PATENT DOCUMENTS 3,742,704 A * 7/1973 Adelizzi ................... F23R 3/60
431/154
5,291,733 A * 3/1994 Halila ....................... F23R 3/60
60/752
(Continued)

FOREIGN PATENT DOCUMENTS

EP    1 152 191 A2   11/2001
EP    2 107 308 A1   10/2009
(Continued)

OTHER PUBLICATIONS

International Search Report in corresponding International Application No. PCT/FR2015/050179 dated Jun. 24, 2015 (2 pages).

*Primary Examiner* — Gerald L Sung
*Assistant Examiner* — Scott Walthour
(74) *Attorney, Agent, or Firm* — Bookoff McAndrews, PLLC

(57) ABSTRACT

An annular combustion chamber (10) for a turbomachine (100), the combustion chamber presenting an axial direction (X), a radial direction, and an azimuth direction, and comprising a first annular wall (12) and a second annular wall (14), each wall delimiting at least a portion of the volume of the annular combustion chamber (10), the first and second walls (12, 14) presenting complementary fitting elements
(Continued)

(12d, 14d), the first wall (12) presenting at least one first through hole (12f), while the second wall (14) presents at least one second through hole (14f), the combustion chamber (10) also having at least one pin (18) engaged in a pair of holes comprising a first hole (12f) and a second hole (14f), said pin (18) locking the fitting of the first and second walls (12, 14).

10 Claims, 3 Drawing Sheets

(51) Int. Cl.

| | | |
|---|---|---|
| *F02C 7/20* | (2006.01) | |
| *F23R 3/50* | (2006.01) | |
| *F23R 3/54* | (2006.01) | |
| *F23R 3/28* | (2006.01) | |
| *F23R 3/42* | (2006.01) | |
| *F23R 3/48* | (2006.01) | |
| *F23C 5/02* | (2006.01) | |
| *F23R 3/46* | (2006.01) | |
| *F23R 3/56* | (2006.01) | |
| *F23R 3/60* | (2006.01) | |
| *F23D 11/10* | (2006.01) | |
| *F23R 3/00* | (2006.01) | |

(52) U.S. Cl.
CPC ............... *F23R 3/28* (2013.01); *F23R 3/283* (2013.01); *F23R 3/42* (2013.01); *F23R 3/425* (2013.01); *F23R 3/46* (2013.01); *F23R 3/48* (2013.01); *F23R 3/50* (2013.01); *F23R 3/54* (2013.01); *F23R 3/56* (2013.01); *F23R 3/58* (2013.01); *F23R 3/60* (2013.01); *F05D 2230/50* (2013.01); *F05D 2230/51* (2013.01); *F05D 2230/64* (2013.01); *F05D 2230/642* (2013.01); *F05D 2240/35* (2013.01); *F05D 2240/90* (2013.01); *F05D 2260/30* (2013.01); *F23D 11/103* (2013.01); *F23R 3/007* (2013.01); *F23R 2900/00005* (2013.01); *F23R 2900/00017* (2013.01); *F23R 2900/00018* (2013.01); *F23R 2900/00019* (2013.01)

(58) Field of Classification Search
CPC ..... F23R 3/283; F23R 3/28; F23R 3/42–3/48; F23R 3/54–3/58; F23R 2900/00005; F23R 2900/00018; F23R 2900/00019; F23C 5/02; F23D 11/103; F02C 7/20; F05D 2230/50; F05D 2230/51; F05D 2230/64; F05D 2230/642; F05D 2240/35; F05D 2240/90; F05D 2260/30
See application file for complete search history.

(56) References Cited

U.S. PATENT DOCUMENTS

| | | | | |
|---|---|---|---|---|
| 2005/0223709 | A1* | 10/2005 | Bleeker | F23C 5/02 60/737 |
| 2008/0104962 | A1* | 5/2008 | Patel | F23R 3/10 60/752 |
| 2013/0291544 | A1* | 11/2013 | Eastwood | F23R 3/50 60/734 |
| 2014/0190167 | A1* | 7/2014 | Shi | F23R 3/007 60/737 |
| 2015/0052901 | A1* | 2/2015 | Davenport | F23R 3/002 60/752 |

FOREIGN PATENT DOCUMENTS

| | | | | |
|---|---|---|---|---|
| WO | WO 2012104525 A1 * | 8/2012 | | F23D 11/103 |
| WO | WO 2012/168636 A2 | 12/2012 | | |
| WO | WO 2012168636 A2 * | 12/2012 | | F23R 3/002 |

* cited by examiner

ANNULAR TURBOMACHINE COMBUSTION CHAMBER

CROSS-REFERENCE TO RELATED APPLICATIONS

This application is the U.S. national phase entry under 35 U.S.C. § 371 of International Application No. PCT/FR2015/050179, filed on Jan. 27, 2015, which claims priority to French Patent Application No. 1451321, filed on Feb. 19, 2014.

FIELD OF THE INVENTION

The invention relates to the field of turbomachine combustion chambers, and more particularly to the field of annular combustion chambers for a turbomachine, and particularly but not exclusively for a helicopter turboshaft engine.

The term "turbomachine" is used to mean any gas turbine apparatus that generates driving power, including in particular turbojets that provide thrust needed for propulsion in reaction to ejecting hot gas at high speed, and turboshaft engines where the driving power is delivered by rotating a drive shaft. For example, turboshaft engines are used as engines in helicopters, ships, trains, and indeed as industrial power plants. Turboprops (a turboshaft engine driving a propeller) are likewise turboshaft engines used as aeroengines.

STATE OF THE PRIOR ART

A conventional annular combustion chamber for a turbomachine presents an axial direction, a radial direction, and an azimuth direction, and it generally comprises five annular walls, each annular wall delimiting at least a portion of the volume of the combustion chamber.

Those annular walls are conventionally assembled together by welding or by bolting. Assembling them together by welding makes it impossible to disassemble a first wall from a second wall, e.g. for maintenance or for the purpose of replacing one of the walls. Assembly by bolting presents the drawback of encouraging cracks to appear in the vicinity of the holes in which the bolts are engaged because of the blocking that is generated, thereby weakening the combustion chamber. In addition, assembling in those ways is complex, lengthy, and expensive.

SUMMARY OF THE INVENTION

An embodiment provides an annular combustion chamber for a turbomachine, the combustion chamber presenting an axial direction, a radial direction, and an azimuth direction, and comprising a first annular wall and a second annular wall, each wall delimiting at least a portion of the volume of the annular combustion chamber, the first and second walls presenting complementary fitting elements, the first wall presenting at least one first through hole, while the second wall presents at least one second through hole, the combustion chamber also having at least one pin engaged in a pair of holes comprising a first hole and a second hole, said pin locking the fitting of the first and second walls.

It can be understood that the first annular wall has first fitting elements while the second annular wall has second fitting elements, the first and second fitting elements being respectively complementary to one another so as to be able to co-operate by fitting in the axial and/or azimuth direction of the combustion chamber. In other words, the first and second fitting elements are fitted or mutually engaged by moving them relative to each other along the axial and/or azimuth direction of the combustion chamber.

The combustion chamber may have two or more annular walls. With more than two walls, the assembly of the plurality of annular walls can be locked by the pin. For example, a single pin can lock together the assembly of at least three (or more) distinct walls. In another example, a pin may lock together the assembly of two walls, namely a first wall and a second wall, while another pin locks together the assembly of the first or the second wall with a third wall.

It can be understood that the first wall presents one or more first holes, and that the second wall presents one or more second holes. Naturally, in a variant, there are as many first holes as there are second holes, each first hole being paired with a second hole (or vice versa). Below, and unless specified to the contrary, the terms "first hole" and "second hole" designate either the only first hole or all of the first holes or the only second hole or all of the second holes.

The combustion chamber has one or more pins. Below, and unless specified to the contrary, the term "pin" is used to mean the only pin or all of the pins. By way of example, the pin may be a rod or a clip configured to be engaged simultaneously in a first hole and in a second hole forming a pair of holes. The pin is engaged with or without clearance in a pair comprising a first hole and a second hole. Such a pin co-operates only by fitting in or engaging with the pair of holes so as to couple together the first and second walls relative to one or more degrees of freedom, e.g. in axial translation and/or in rotation about the axial direction of the combustion chamber, while nevertheless not blocking all degrees of freedom. Such a pin makes it possible to avoid, or to reduce significantly, the risk of cracks appearing in comparison with the conventional use of bolts. Thus, such a pin enables the walls of the combustion chamber to be assembled together without any need for welding and/or for crimping together the two walls, as is done with combustion chambers in the prior art.

Naturally, when the combustion chamber presents a plurality of pairs of first and second holes, said combustion chamber may present a plurality of pins, each pin being engaged in a pair of holes. In a variant, when a pin is provided in a pair of holes, that pair of holes receives a single pin. In a variant, there are as many pins as there are pairs of first and second holes. In a variant, the pins are similar.

The pin blocks relative movements axially and/or in azimuth between the first and second walls. Thus, when the pins are engaged in the hole pair(s), the fitting between the first and second walls is locked. In order to separate the first and second walls from each other, it is therefore necessary to begin by withdrawing the pin(s) from the first and second hole pair(s).

Thus, the combustion chamber can be assembled easily, quickly, and at low cost compared with combustion chambers of the prior art, and without requiring a welding operation. Furthermore, such a combustion chamber can just as easily be disassembled, thereby facilitating maintenance operations.

In some embodiments, the first hole and the second hole of the pair of holes are disposed substantially facing each other.

It can also be understood that the term "facing" is used to mean that the first hole is in alignment axially and in azimuth with the second hole, presenting the same angular position. In other words, the first and second holes of the pair of holes are not diametrically opposite. Such a facing configuration makes it possible to use pins that are simple and enables assembly to be easy and effective.

In some embodiments, the pin is formed by an injector.

Naturally, the combustion chamber may present other pins formed by other elements. In a variant, the combustion chamber may present a plurality of pins, each pin being formed by an injector.

Using an injector as a pin leads to a saving in weight for the combustion chamber, where saving weight is a major concern in turbomachines used in aviation. This also simplifies the structure of the combustion chamber, which can contribute to facilitating assembly and/or disassembly. Furthermore, by using injectors as pins, it is possible to fasten and position the combustion chamber directly in this way within a turbomachine.

In some embodiments, the pin extends substantially radially.

The term "substantially radial direction" is used to mean a direction that is parallel to a radial plane and that forms an angle lying in the range 60° to 120° relative to the axis of the combustion chamber.

Such an orientation for the pin(s) serves to facilitate assembly of the combustion chamber and the locking of the fitting is even more satisfactory.

In some embodiments, the complementary fitting elements comprise a plurality of axial tongues extending from one wall from among the first and second walls, and a plurality of openings provided in the other wall from among the first and second walls, said openings receiving the tongues. Under such circumstances, the complementary fitting elements form complementary elements for axial fitting.

It can be understood that the first wall and/or the second wall has/have one or more tongues. Thus, the first wall may present tongues while the second wall does not present any tongue, the first wall may present no tongues while the second wall presents tongues, or indeed the first wall may present a plurality of first tongues while the second wall presents a plurality of second tongues.

The other wall has openings arranged facing the tongues, so as to be capable of receiving the tongues and of co-operating with them by axial fitting. Thus, if only the first wall presents tongues, then the second wall presents openings, if only the second wall presents tongues, then the first wall presents openings, whereas if the first wall presents first tongues and the second wall presents second tongues, then the first wall presents first openings for receiving the second tongues and the second wall presents second openings for receiving the first tongues.

In a variant, the tongues and the openings are regularly distributed (or spaced apart) in azimuth. It can thus be understood that the angular spacing between adjacent tongues and adjacent openings is equal. Such a distribution makes it possible to obtain a degree of symmetry of revolution for the complementary fitting elements, thereby facilitating operations of fitting the walls together, and thus of assembling the combustion chamber.

In some embodiments, the hole of one of the walls from among the first and second walls is provided in a projecting blade.

It can be understood that the blade is a portion projecting from the first wall if the hole is the first hole, or that the blade is a portion projecting from the second wall if the hole is a second hole. Such a configuration makes it possible to reduce the weight of a wall while reducing the overall size of the combustion chamber in the vicinity of the blade.

Furthermore, such a configuration makes it possible to confine the location of the hole to a particular position that is well controlled within the combustion chamber, thereby reducing any risk of leaks, such leaks being penalizing from the point of view of the performance of the combustion chamber.

In some embodiments, a projection arranged in the vicinity of the other hole from among the first hole and the second hole extends substantially parallel to the axis of said other hole so as to co-operate with the blade by snap-fitting.

For example, the vicinity of a hole includes an annular portion of the wall that extends around the hole over three times the diameter (or maximum dimension) of the hole. For example, the projection is formed by a projection machined directly on the wall, e.g. by die-stamping, or by a separate part fastened to the wall.

Snap-fitting (or clipping) is a technique for assembling together two portions by mutual engagement and elastic deformation (in general local deformation, e.g. of the blade, or by deforming all of the parts involved in the assembly). When the two portions are engaged in the snap-fitting position, they have generally returned to their initial shapes and no longer present any elastic deformation (or they present less elastic deformation). When the two portions are engaged with each other in the snap-fitting position, they co-operate with each other so as to oppose, or indeed block, relative movements between said parts in the disengagement direction (the direction opposite to the engagement direction). In the snap-fitting position, the two portions can also co-operate in such a manner as to oppose, or indeed block, relative movements between them in the direction for extending the engagement beyond the snap-fitting position.

Such snap-fitting enables the first and second walls to be held in a fitted position prior to locking the fitting by using the pin.

In some embodiments, the border of said other hole forms a projection extending substantially parallel to the axis of said other hole so as to co-operate with the blade by snap-fitting.

In some embodiments, one of the walls from among the first wall and the second wall presents an axial annular shoulder co-operating in abutment with the other wall from among the first wall and the second wall.

Such a shoulder makes it possible to form a join plane between the first and second walls whereby leaks from within the combustion chamber are minimized or reduced to zero.

In some embodiments, the combustion chamber has only two annular walls delimiting the volume of the combustion chamber, namely the first annular wall and the second annular wall.

The first and second walls thus suffice on their own to define the volume of the combustion chamber. Such a combustion chamber presents a particularly small number of walls, thereby making it that much easier, faster, and inexpensive to assemble. Furthermore, disassembly operations for maintenance purposes are also made easier. Furthermore, a combustion chamber presenting such a small number of walls presents particularly low risks of leaks in the vicinity of the joints between the various walls.

An embodiment provides a turbomachine including a combustion chamber according to any of the embodiments described in the present description.

BRIEF DESCRIPTION OF THE DRAWINGS

The invention and its advantages can be better understood on reading the following detailed description of various embodiments of the invention given as non-limiting examples. The description refers to the accompanying sheets of figures, in which.

DETAILED DESCRIPTION OF EMBODIMENTS

Figure 1:
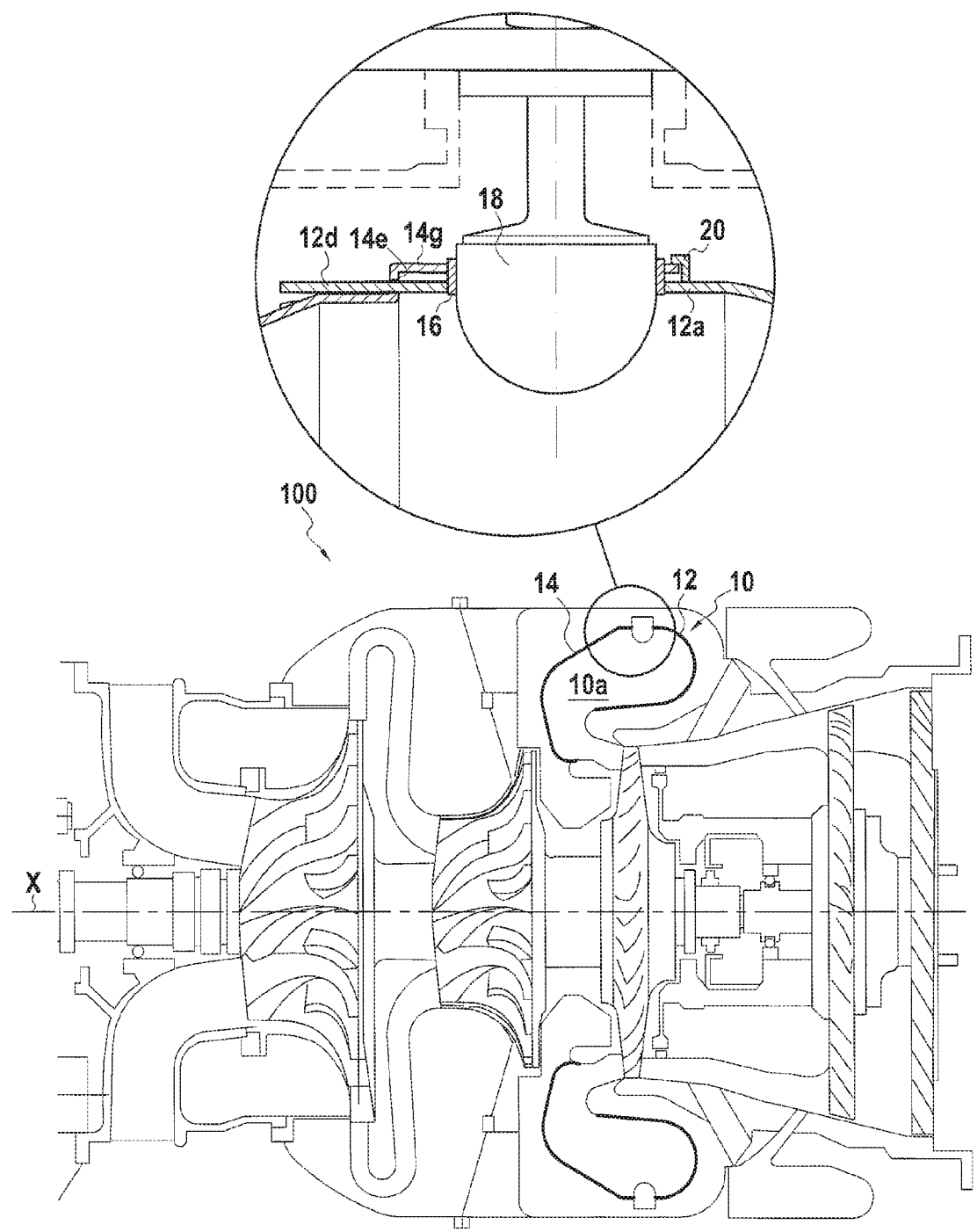
FIG. 1 shows a turbomachine having a combustion chamber.
Figure 2:
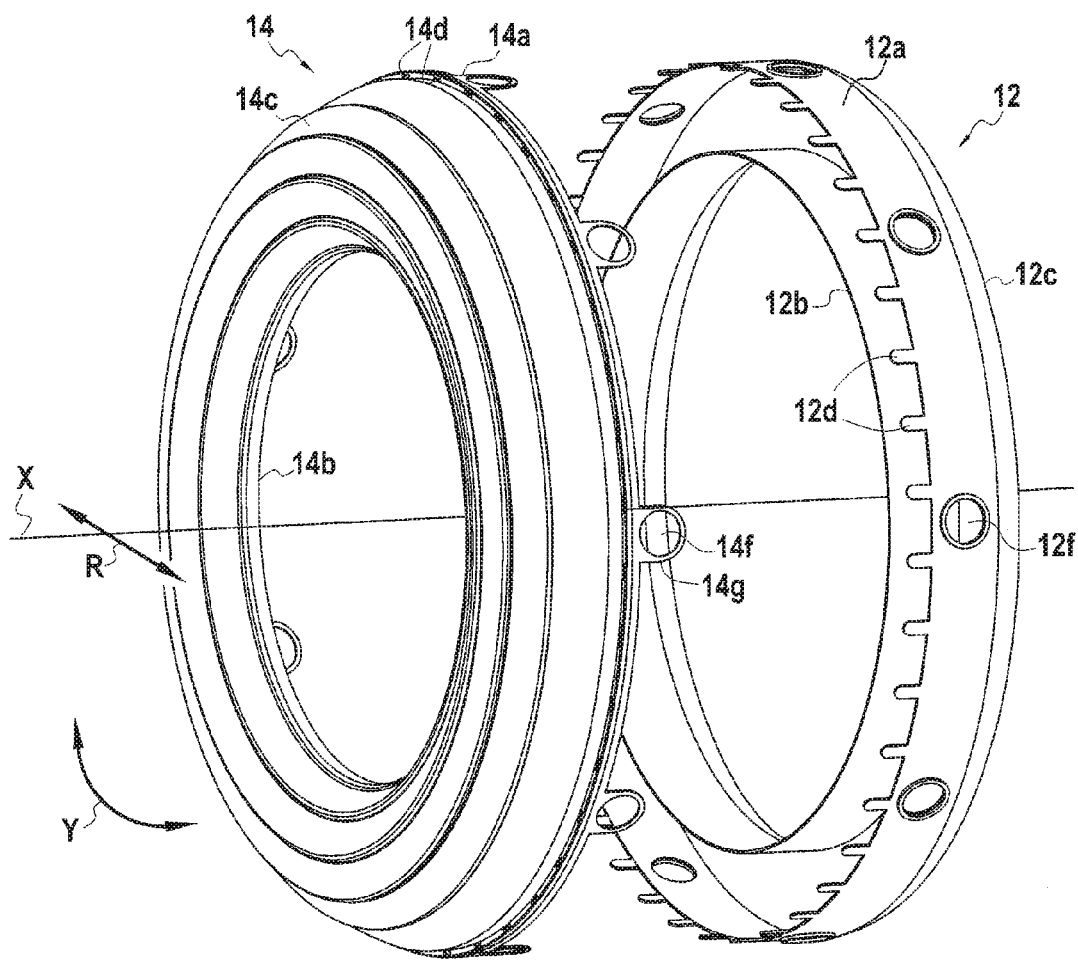
FIG. 2 shows the annular walls of the FIG. 1 combustion chamber seen in perspective.
Figure 3:
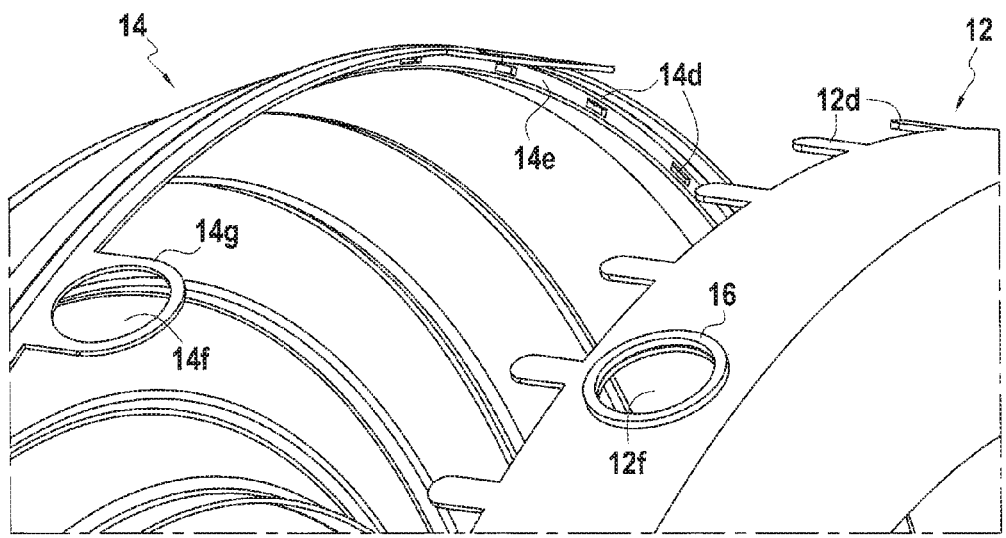
FIG. 3 is a detail view of the annular walls of FIG. 1.
Figure 4:
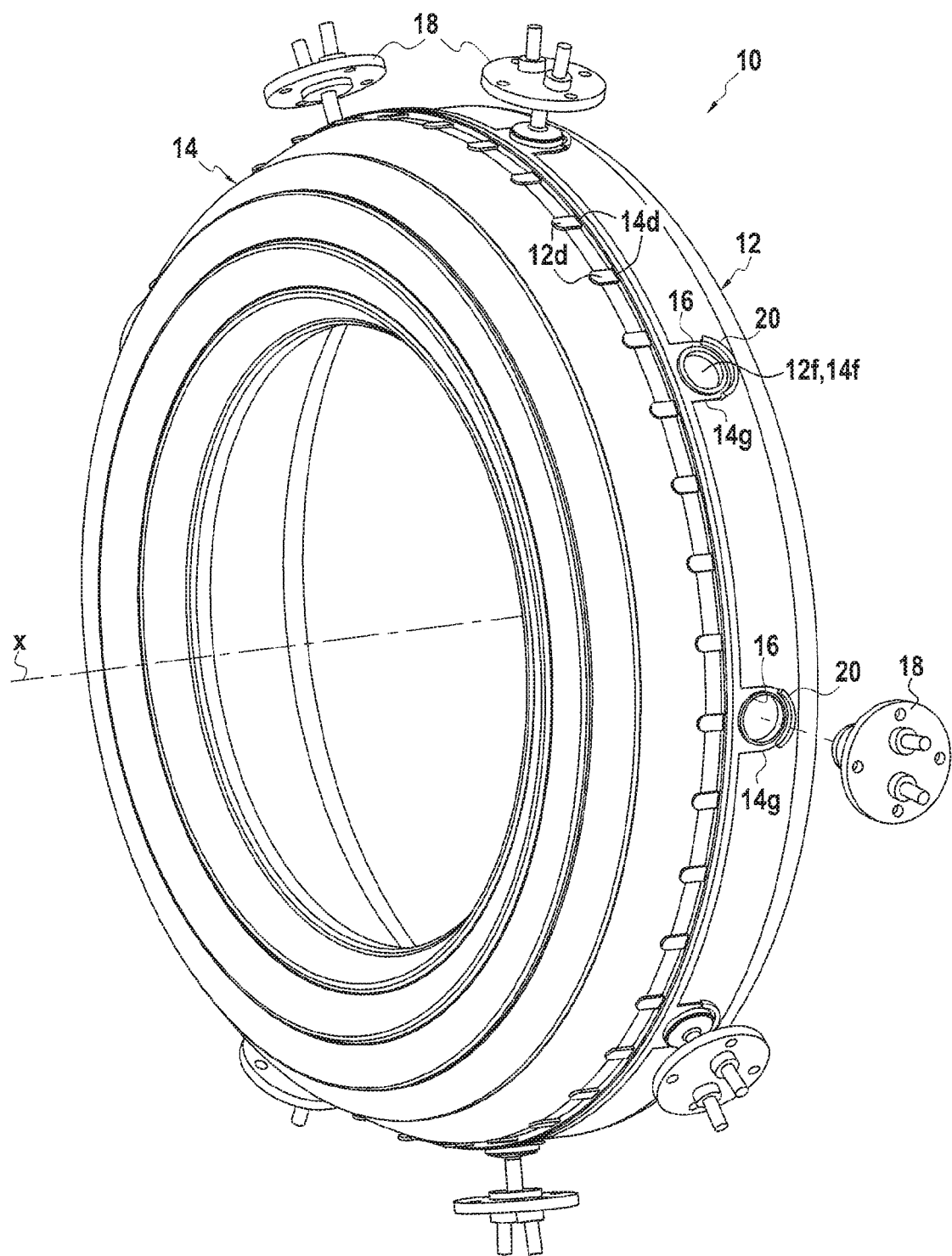
FIG. 4 shows the annular walls of FIG. 1 when assembled together.

FIG. 1 shows a turbomachine 100 having an annular combustion chamber 10, while FIGS. 2 to 4 show the two annular walls 12 and 14 of the combustion chamber 10 in greater detail. It should be observed that the combustion chamber 10 is an annular chamber of the reverse flow type, but that the invention is not limited to this particular type of combustion chamber.

The combustion chamber 10 presents an axial direction (along the axis X), a radial direction R, and an azimuth direction Y. The combustion chamber 10 presents symmetry of revolution about the axis X. In this example, the first wall 12 forms a flame tube delimiting the volume in which the fuel ignites, i.e. where combustion takes place. The second wall 14 forms an outer bend and serves as a deflector for guiding the flow of gas coming from the flame tube. This combustion chamber example 10 has only two annular walls 12 and 14 for delimiting the volume 10a of the combustion chamber 10.

More particularly, each of the first wall 12 and the second wall 14 presents a general shape that is substantially half a torus, the torus being split perpendicularly to its axis of revolution, like a donut mold, the two half-toruses being placed facing each other. Thus, each wall 12 and 14 has an outer portion 12a, 14a that is substantially axial, an inner portion 12b, 14b that is substantially axial, and a bottom 12c, 14c that is substantially radial interconnecting the outer and inner portions 12a and 12b of the first wall 12, or the outer and inner portions 14a and 14b of the second wall 14. It should be recalled that in general, and unless specified to the contrary, the adjectives "inner" and "outer" are used with reference to a radial direction such that an inner portion (i.e. a radially inner portion) of an element is closer to the axis X than is an outer portion (i.e. radially outer portion) of the same element.

In this example, the radius of the outer portion 12a of the first wall 12 is substantially equal to, but less than, the radius of the outer portion 14a of the second wall 14, while the radius of the inner portion 12b of the first wall 12 is greater than the radius 14b of the second wall 14. It is thus possible to assemble the first wall 12 with the second wall 14 via their outer walls 12a and 14a, the outer portion 12a of the first wall 12 being arranged inside the outer portion 14a of the second wall 14, while the difference in radius of the inner portions 12b and 14b serves to create an exhaust duct for the combustion gas.

The first wall 12 presents a plurality of axial tongues 12d, while the second wall 14 presents a plurality of openings 14d configured to receive the tongues 12d of the first wall 12. The tongues 12d and the openings 14d in this example form complementary axial fitting elements of the first and second walls 12 and 14. Naturally, in a variant that is not shown, tongues could form complementary elements for fitting in azimuth, or for fitting both axially and in azimuth.

The axial tongues 12d extend axially from the outer portion 12a of the first wall 12. The openings 14d are arranged in an annular shoulder 14e that extends radially and that connects the outer portion 14a to the bottom 14c of the second wall 14. In this example, there are as many tongues 12d as there are openings 14d, each opening 14d receiving one tongue 12d.

When the first wall 12 is fitted axially with the second wall 14, the tongues 12d are caused to penetrate into the openings 14d, while the free axial end of the outer portion 12a of the first wall co-operates with the shoulder 14e by coming axially into abutment therewith.

The first wall 12 presents a plurality of first through holes 12f, with the axes of these holes 12f extending radially. These holes 12f are arranged in the outer portion 12a of the wall 12. The second wall 14 presents second through holes 14f with axes that extend radially. The holes 14f are arranged in blades 14g that project axially from the outer portion 14a of the second wall 14. In this example, the holes 12f and 14f are substantially circular, however they could naturally present some other shape. When the first and second walls 12 and 14 are fitted, the holes 12f and 14f face one another. In this example, there are as many first holes 12f as there are second holes 14f.

A sleeve 16 configured to receive an injector 18 is fastened in each first hole 12f, e.g. by welding or crimping. The sleeve 16 forms a border that projects outwardly along the axis of each first hole 12f. The maximum radius of the sleeve 16 is less than the radius of the second hole 14f. Thus, during fitting of the first and second walls 12 and 14, each blade 14g co-operates by snap-fitting with a sleeve 16.

In order to block the blades 14g snap-fitting with the sleeves 16, after the first and second walls 12 and 14 have been fitted, a rim 20 is installed on the outside of the outer portion 12a of the first wall 12. By way of example, the rim 20 is welded on. Such a rim 20 provides intermediate blocking of the fitting of the walls 12 and 14 prior to installation of the injectors 18 that are described below and that form pins for locking the fitting. One or more rims may be provided. In this example, there are as many rims 20 as there are blades 14g. Naturally, these rims 20 are optional and they may thus be omitted in some combustion chamber variants.

When the first and second walls 12 and 14 are axially fitted, the first holes 12f face the second holes 14f. An injector 18 is then inserted into each facing pair of first and second holes 12f and 14f, the injector forming a pin that locks the fitting of the first and second walls 12 and 14. The injectors 18 extend radially through each pair of holes 12f and 14f. The injectors 18 are engaged with clearance in each pair of holes so as to allow relative movements between each of the elements due to differential thermal expansion, but nevertheless they couple together the first and second walls 12 and 14 in translation along the axial direction X and in rotation in the azimuth direction Y. Naturally, the sleeve 16 also contributes to coupling together the first and second walls 12 and 14, but this coupling is relatively fragile, in particular because of thermal expansion differences that, under some circumstances, can cause the blades 14g to cease co-operating effectively with the sleeve 16, and in spite of the rims 20. Thus, the essential part of the locking of the fitting between the first and second walls 12 and 14 is provided by the pins formed by the injectors 18.

Although the present invention is described with reference to specific embodiments, it is clear that modifications and changes may be made to these embodiments without going beyond the general ambit of the invention as defined by the claims. In particular, individual characteristics of the various embodiments shown and/or mentioned may be combined in additional embodiments. Consequently, the description and the drawings should be considered in a sense that is illustrative rather than restrictive.

The invention claimed is:

1. An annular combustion chamber for a turbomachine including an axial direction, a radial direction, and an azimuth direction, the annular combustion chamber comprising a first annular wall and a second annular wall, each of the first annular wall and the second annular wall delimiting at least a portion of a volume of the annular combustion chamber, the first annular wall and the second annular wall including complementary fitting elements, the first annular wall including at least one first through hole, while the second annular wall includes at least one second through hole, the annular combustion chamber also having at least one pin engaged in a pair of through holes comprising one first through hole and one second through hole, said at least one pin locking a fitting together of the first annular wall and the second annular wall, said at least one pin being formed by an injector;

wherein one of the one first through hole or the one second through hole of the pair of through holes is provided in a projecting blade; and wherein a projection arranged at the other of the one first through hole or the one second through hole of the pair of through holes extends substantially parallel to an axis of said other of the one first through hole or the one second through hole so as to co-operate with the projecting blade by snap-fitting.

2. The annular combustion chamber according to claim 1, wherein the one first through hole and the one second through hole of the pair of through holes are disposed substantially facing each other.

3. The annular combustion chamber according to claim 1, wherein the at least one pin extends substantially radially.

4. The annular combustion chamber according to claim 1, wherein the complementary fitting elements comprise a plurality of axial tongues extending in the axial direction from one of the first annular wall and the second annular wall, and a plurality of openings provided in the other of the first annular wall and the second annular wall, said plurality of openings receiving the plurality of axial tongues.

5. The annular combustion chamber according to claim 1, wherein one of the first annular wall and the second annular wall includes an annular shoulder that co-operates axially in abutment with the other of the first annular wall and the second annular wall.

6. The annular combustion chamber according to claim 1, having only two annular walls delimiting the volume of the combustion chamber, wherein the two annular walls are the first annular wall and the second annular wall.

7. A turbomachine including the annular combustion chamber according to claim 1.

8. An annular combustion chamber for a turbomachine including an axial direction, a radial direction, and an azimuth direction, the annular combustion chamber comprising a first annular wall and a second annular wall, each of the first annular wall and the second annular wall delimiting at least a portion of a volume of the annular combustion chamber, the first annular wall and second annular wall including complementary fitting elements, the first annular wall including at least one first through hole, while the second annular wall includes at least one second through hole, wherein both the at least one first through hole and the at least one second through hole face a radial center of the annular combustion chamber, the annular combustion chamber also having at least one pin engaged in a pair of through holes comprising one first through hole and one-second through hole, said at least one pin locking a fitting together of the first annular wall and second annular wall, said at least one pin being formed by an injector;

wherein one of the one first through hole or the one second through hole of the pair of through holes is provided in a projecting blade; and wherein a projection arranged at the other of the one first through hole or the one second through hole of the pair of through holes extends substantially parallel to an axis of said other of the one first through hole or the one second through hole so as to co-operate with the projecting blade by snap-fitting.

9. The annular combustion chamber of claim 8, wherein the first annular wall includes a plurality of first through holes spaced about a circumference of the first annular wall, and the second annular wall includes a plurality of second through holes spaced about a circumference of the second annular wall, and the annular combustion chamber includes a plurality of injectors spaced about a circumference of the annular combustion chamber, each injector of the plurality of injectors extending through a respective pair of through holes comprising a first through hole and a second through hole, wherein each pair of through holes containing a respective injector of the plurality of injectors faces the radial center of the annular combustion chamber.

10. The annular combustion chamber of claim 9, wherein the complementary fitting elements comprise a plurality of axial tongues extending in the axial direction from one of the first annular wall and the second annular wall, and a plurality of openings provided in the other of the first annular wall and the second annular wall, said plurality of openings receiving the plurality of axial tongues.

* * * * *